UNITED STATES PATENT OFFICE.

GEORGE HOLGATE AND ELON TUPPER, OF HAMILTON, CANADA.

IMPROVEMENT IN PROCESSES OF PRESERVING VEGETABLE AND ANIMAL SUBSTANCES.

Specification forming part of Letters Patent No. 155,949, dated October 13, 1874; application filed August 24, 1874.

*To all whom it may concern:*

Be it known that we, GEORGE HOLGATE and ELON TUPPER, both of Hamilton, in the Province of Ontario, Canada, have invented an Improved Process for Preserving Fruits, Vegetables, &c., of which the following is a full, clear, and exact description.

The object of my improvement is to provide a cheap, simple, and practicable means of preserving, for any desired length of time, fruits, vegetables, &c., and all the finer qualities of berries. The fruits and vegetables may be preserved in their natural state precisely as taken from the tree or gathered from the garden-field.

The nature of our invention consists, first, in the dry fumigation of the article or articles desired to be preserved, by subjecting the same to the action of the gases or fumes generated from a compound consisting of powdered sulphur and charcoal, the ingredients being thoroughly mixed before being ignited. After the process of dry fumigation has been completed, the article or articles are to be submerged in water thoroughly impregnated with the gas or vapor generated from the same composition.

We are aware that we are not the first to use the fumes of sulphur as an agent in the preservation of either animal or vegetable substances; and we are aware that sulphurous-acid gas, in conjunction with carbonic-oxide gas, have also been used in a tight vessel containing charcoal, so that said gases may be absorbed by the charcoal, and hence the imperative necessity of using a tight vessel, but this does not complete the process, as nitrogen or other gases have also to be employed in conjunction therewith. Nor are we aware of any instance where the ingredients, or rather gases, constituting this last process are claimed to have been used in addition to their action as dry fumigating agents; also as agents to impregnate water in which the articles are to be kept. On the contrary, the only instance with which we are familiar where this last process has been employed, no water whatever, whether impregnated or not, is used, the preservation of the substance, be it animal or vegetable, depending solely and entirely on the dry fumigation thereof, and of its being packed and kept in a perfectly air-tight jar or other vessel.

Having thus fully shown what the condition of the art was at the date of our invention, we will proceed to briefly but distinctly state in what our improvement consists, and what are believed to be the advantages of our process—advantages ascertained by practical and oft-repeated experiments, and which constitute its distinguishing features as compared with the processes hereinbefore referred to.

First, as to the chamber or vessel in which the fumigation is designed to be carried on. In all former processes, without a single exception, the vessel to be used has been invariably a tight vessel, so closed as to positively exclude all air. The vessel we use is purposely provided with vents, or other suitable openings, designed especially for the admission of air. Again, in all the processes where the fumes or sulphurous-acid gas have alone been used as the antiseptic agent, the same have been used by burning sulphur alone, and that too in an air-tight vessel. We do not pretend to burn sulphur alone, but powdered sulphur thoroughly mixed with powdered charcoal, and this too in a vessel having suitable openings for the admission of a moderate current of air. Now, apart from the chemical action of the charcoal, but considered purely in its mechanical nature, when powdered and mixed with the sulphur, it would necessarily separate and divide the particles of sulphur, and burning the composition, as we contemplate doing, in a moderate current of air, the charcoal would of course greatly accelerate or quicken the combustion of the sulphur, thus producing more sulphurous acid, and also an acid of a purer quality.

In the only process previous to our invention, in connection with the branch of art to which our improvement relates, in which the use of charcoal in any form has been suggested, the sulphurous acid in connection with other gases is to be poured into a vessel containing charcoal. Thus it will be seen that the charcoal in no manner aids in producing either more or a better quality of sulphurous-acid gas, and all its immense advantages, mechanically considered, which we utilize, are not availed of. Now, in this process, and, as we have said, the only one where the use of charcoal is contemplated, even admitting that the sulphurous and other gases would absorb from the charcoal a small per cent. of carbonic oxide, the only stage in our process where the same, chemically considered, is of value, is one which this former process does not contemplate using—that is, in treating the water. In this respect the carbonic oxide which we obtain is valuable, as it effectually, in connection with sulphurous-acid gas, destroys all the animalculæ which the water contains, rendering the water purer and more free from any destructive element, or element which will work decay, than water can be rendered when treated or processed alone with the fumes of sulphur, as in the latter instance, as ascertained by practical experience, after a certain period, a mildew is clearly perceptible, which is not the case when the water is treated with the combined fumes generated from the admixture of sulphur and charcoal. Again, in this, the only process previous to ours where charcoal is used, owing to the fact that the article is not kept in a processed water, as we contemplate doing, an air-tight jar or other vessel for keeping or preserving the articles is essential. The use of such a jar or vessel is in nowise necessary with our process, as the articles are kept securely in any suitable vessel, it being closed at top by any suitable substance which will exclude dirt and insects.

Thus, the difference between our process and those which have preceded may be summed up as follows: First, we process the article and water in a vessel purposely provided with suitable vents for the admission of air, while heretofore air-tight vessels have been invariably used. For the processing both in our system, as well as in those which preceded it, wooden vessels are used. Experience shows that, when an air-tight vessel is used, it soon becomes valueless, as the material, owing to its porous nature, soon becomes so saturated with the sulphurous acid as to so deoxidize the air that the sulphur will no longer burn. With our vessel, this is impossible. Again, we are the first to avail ourselves of the mechanical advantages of charcoal to aid in producing the sulphurous-acid gas. Again, we are the first to avail ourselves of the chemical properties which charcoal is known to possess, to assist in thoroughly destroying the animalculæ in the water. Again, we keep the articles in water, and which no process in which charcoal, used at any stage, contemplated doing. Again, we keep our processed articles in any kind of a vessel which is liquid-tight, to prevent the water from leaking, while the other process in which charcoal is used requires an air-tight vessel to keep the articles in.

The description of our invention is as follows: In a suitable box having proper vents or other openings for the admission of a moderate current of air to accelerate and quicken the combustion of the composition, after the same has been ignited, we place, in a suitable pan, tray, or other vessel, the composition, which consists of, say, four parts of powdered sulphur and one part powdered charcoal, (but there is nothing arbitrary about this exact proportion, as it may be changed without altering or affecting our invention,) the same having been previously thoroughly mixed together. The fruit or other article, it matters not whether the same be a vegetable or animal substance, is now placed in a basket or other open receptacle, and, by any convenient means, suspended in the box or chamber; and, at the same time, if desired, the water, which is afterward to be used in keeping the fruits or other articles, may also be placed in buckets or other open-top vessels in the same chamber; and thus the dry fumigation of the article or articles to be preserved, and the proper impregnation of the water with the same fumes, may be carried on at one and the same time. The vents in the box are now opened for the admission of air, and the composition ignited. The result is owing to the fact that the particles of charcoal separate and divide the particles of sulphur, in connection with the further fact that the composition is burning in a moderate current of air, the rapid combustion of the sulphur is effected, and more and a purer sulphurous-acid gas is produced. This dry fumigation is carried on, say, from one to four hours, according to the nature of the article under treatment. After the first stage of the process is completed, and the article or articles are thoroughly fumigated, and the water so impregnated as to have thoroughly destroyed all the animalculæ contained therein, the articles are placed in a suitable jar or other vessel, and the processed water poured in and over the same, so as to rise, say, an inch or two above the article or articles to be kept, and thus thoroughly submerge the same. Then place the filled jar back into the box. Repeat the process, say, for one-half hour or so, according to the nature of the article under treatment. This finishes the process, and the jars are now removed, and their mouths or openings covered with any suitable material that will exclude insects, dirt, and other impurities.

The process herein described is admirably adapted, and can be advantageously used in connection with all pickled or cured meats, and in which the pickle or brine shows symptoms of taint or sourness, first, by passing the same through the first stage of the process, and then repickling with the impregnated water referred to. The same process is also equally applicable to the preservation of eggs.

What we claim as our invention, and de- sire to secure by Letters Patent of the United States, is—

1. In the process of preserving animal or vegetable substances, the method of subjecting them, in a free state, to the fumes from a burning composition of finely-divided charcoal and sulphur, substantially as described.

2. The process of preserving vegetable and animal substances, which consists in submitting them to the joint fumes of finely-divided charcoal and sulphur mixed, the charcoal also causing more complete combustion of the sulphur, and then putting them into water which has been impregnated with fumes of the same kind, substantially as specified.

In testimony whereof we have signed our names to this specification in the presence of two subscribing witnesses.

GEORGE HOLGATE.
ELON TUPPER.

Witnesses:
JAMES CAHILL,
EDWIN CAHILL.